US009574672B2

(12) United States Patent
Lin et al.

(10) Patent No.: US 9,574,672 B2
(45) Date of Patent: Feb. 21, 2017

(54) METHODS AND APPARATUS TO ACCESS AND ALIGN SEALING DISCS (71) Applicant: Emerson Process Management Regulator Technologies, Inc., McKinney, TX (US)

(72) Inventors: Chun Lin, McKinney, TX (US); G. Glynn Crutsinger, McKinney, TX (US); Jeffrey Sanders, McKinney, TX (US); Tung Nguyen, McKinney, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 66 days.

(21) Appl. No.: 14/332,086

(22) Filed: Jul. 15, 2014

(65) Prior Publication Data

US 2015/0330517 A1  Nov. 19, 2015

Related U.S. Application Data (60) Provisional application No. 61/993,990, filed on May 15, 2014.

(51) Int. Cl.
F16K 1/00 (2006.01)
G05D 16/06 (2006.01)
F16K 7/12 (2006.01)
B23P 15/00 (2006.01)
F16K 27/02 (2006.01)

(52) U.S. Cl.
CPC ............... *F16K 7/12* (2013.01); *B23P 15/001* (2013.01); *F16K 1/00* (2013.01); *F16K 27/0236* (2013.01); *G05D 16/063* (2013.01); *Y10T 29/49407* (2015.01)

(58) Field of Classification Search
CPC .......... F16K 27/0236; F16K 7/12; F16K 1/00; Y10T 29/49407; B23P 15/001; G05D 16/063
USPC ............. 251/335.2; 137/484.4, 484.6, 484.8, 137/505.13, 505.14, 505.18, 505.26
See application file for complete search history.

(56) References Cited

U.S. PATENT DOCUMENTS 2,042,781 A * 6/1936 Grove ................. G05D 16/163
                                                            137/489
2,599,577 A   6/1952 Norgren
3,001,550 A   9/1961 Engel et al.
(Continued)

FOREIGN PATENT DOCUMENTS

GB           507783        6/1939

OTHER PUBLICATIONS

Patent Cooperation Treaty, "International Search Report," issued in connection with PCT Patent Application No. PCT/US2015/030939, mailed on Sep. 9, 2015, 5 pages.
(Continued)

*Primary Examiner* — Marina Tietjen
(74) *Attorney, Agent, or Firm* — Hanley, Flight & Zimmerman, LLC (57) ABSTRACT Methods and apparatus to access and align sealing discs are disclosed herein. An example apparatus includes a cage of a fluid regulator, where the cage has a central aperture, and a valve stem to be received by the central aperture. The example apparatus also includes a diaphragm coupled to the valve stem, where an integral protrusion of the cage is to constrain a peripheral edge of the diaphragm against a removable portion of a valve body when the cage is coupled to the valve body.

21 Claims, 6 Drawing Sheets (56) References Cited

U.S. PATENT DOCUMENTS

| | | | | |
|---|---|---|---|---|
| 3,392,749 A * | 7/1968 | Gneiding | ........... | G05D 16/0655 |
| | | | | 137/484.6 |
| 3,902,522 A * | 9/1975 | Karenfeld | .......... | G05D 16/0658 |
| | | | | 137/484.6 |
| 5,238,021 A * | 8/1993 | Powell | ............... | G05D 16/0658 |
| | | | | 137/505.18 |
| 5,586,569 A * | 12/1996 | Hanning | ............ | G05D 16/0663 |
| | | | | 137/116.5 |
| 8,281,803 B2 * | 10/2012 | Mevius | ................. | F16K 31/165 |
| | | | | 137/484.8 |
| 2004/0206401 A1 * | 10/2004 | Hecking | ............ | G05D 16/0669 |
| | | | | 137/505.18 |
| 2014/0090726 A1 | 4/2014 | Hawkins et al. | | |

OTHER PUBLICATIONS

Patent Cooperation Treaty, "Written Opinion," issued in connection with PCT Patent Application No. PCT/US2015/030939, mailed on Sep. 9, 2015, 6 pages.
Emerson Process Management, "133 Series Direct-Operated Regulators," Jun. 2013, 24 pages.
Emerson Process Management, "Direct-Operated Regulator," Instruction Manual, Jun. 2004, 8 pages.
Emerson Process Management, "Slam Shut Valve," Instruction Manual, Mar. 2005, 4 pages.
Emerson Process Management, "M Series Pressure Regulators," Instruction Manual, Feb. 2012, 16 pages.
Itron, "RR 16 Commercial & Industrial Regulator," Specifications, Nov. 2003, 8 pages.
Itron, "RB4000 Series Regulator," Publication, Nov. 2010, 25 pages.

* cited by examiner

METHODS AND APPARATUS TO ACCESS AND ALIGN SEALING DISCS

RELATED APPLICATION

This application claims the benefit under 35 U.S.C. §119 (e) to U.S. Provisional Application 61/993,990 titled "METHODS AND APPARATUS TO ACCESS AND ALIGN SEALING DISCS," filed May 15, 2014, which is incorporated herein by this reference in its entirety.

FIELD OF THE DISCLOSURE

This patent relates generally to actuators and, more particularly, to methods and apparatus to access and align sealing discs.

BACKGROUND

Fluid control valves are commonly distributed throughout process control systems to control flow rates and/or pressures of various fluids (e.g. liquids, gases, etc.). A fluid control valve assembly typically includes a valve body, a cage within the valve body, a stem, and an actuator (e.g., a pneumatic actuator) to displace the valve stem to operate the fluid control valve by movement of the valve stem to position a plug or flow control member within the valve. The cage within the valve body typically interfaces with numerous components, which can result in assembly variability (e.g., tolerance stack-up and/or alignment issues, etc.). Additionally, the serviceable components of fluid control valves are typically only accessible via a single end or side of the fluid control valve.

SUMMARY

One described example apparatus includes a cage of a fluid regulator, where the cage has a central aperture, and a valve stem to be received by the central aperture. The example apparatus also includes a diaphragm coupled to the valve stem, where an integral protrusion of the cage is to constrain a peripheral edge of the diaphragm against a removable portion of a valve body when the cage is coupled to the valve body.

Another described example apparatus includes a valve body of a fluid regulator, a cage disposed in the valve body, where the cage is to engage a diaphragm. The example apparatus also includes a valve stem to move along a central aperture of the cage and a removable portion of the valve body at a first end of the valve body where the stem enters the valve body, where the removal of the removable portion is to allow access to a first sealing disc from the first end.

A described example method includes removing a removable portion of a valve body, where the removable portion is on a first end of the valve body where a stem is to enter the valve body. The example method also includes removing a cage from the valve body through a first aperture provided by the removal of the removable portion, where a second aperture of the cage aligns the stem, and accessing a sealing disc of the valve body via the first aperture.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Many known fluid control valve assemblies include an actuator and a fluid valve. Typically, the fluid valve has trim components (e.g., a sealing disc, a valve stem, a seat ring, etc.) that can only be accessed from one side of the fluid valve (e.g., the top or bottom). Further, accessing the fluid valve requires numerous components of the fluid valve to be removed to access the trim components. In particular, sealing discs that control the fluid flow characteristics of fluid valves may require service and/or replacement due to normal wear. Often, the fluid valve includes numerous components to align sealing discs, thereby introducing difficulties in alignment due to the dimensional variations of the components (e.g., a tolerance stack-up). Also, the use of numerous alignment components results in having to inventory, service, etc. a relatively large number of parts.

The example diaphragm actuated fluid control valves disclosed herein enable ease of access to valve trim components by allowing access to trim via more than one side or location (e.g., surface, portion, etc.) of the valve body. The disclosed example fluid control valves allow access to trim components via a side of the fluid control valve corresponding to the valve stem and a second side of the fluid control valve opposite the valve stem, thereby enabling access to the trim components in different placement or field installation scenarios. More specifically, in some disclosed examples, a cage of a fluid control valve may have a removable upper portion adjacent where the valve stem enters the valve and a removable bottom portion opposite the end where the valve stem enters the valve. These removable portions enable flexibility in accessing the valve to replace trim components, for example, within the valve.

The examples disclosed herein also allow improved alignment of components by reducing tolerance stack-up issues through component integration. In particular, an example cage of a fluid valve may have different aligning features integral to the cage (e.g., formed on the cage) to perform positioning and/or alignment of a valve stem normally accomplished by numerous components in addition to a cage. In some examples, the cage has a protrusion to directly contact or engage a balancing diaphragm, which is captured between a removable upper portion of the valve (e.g., valve body) and the cage. In other examples, the cage may have another protrusion to align itself to a recess in the removable upper portion. Further, the reduction in the number of components via part integration reduces inventory complexity and simplifies part number management and/or tracking of the Bill of Materials (BOM). Reductions in Stock Keeping Units or "SKUs" of components also allows reduction of spare part inventories and complex supply chain management of numerous configurations.

In some examples, the cages have an aperture with a first shape and the stem has a second shape complementary to the first shape to prevent rotation of the stem in a tangential direction (i.e., prevent rotation of the stem about a central axis of the stem). In some examples, the first and second shapes may be hex shaped, square shaped, pentagon shaped, oval shaped, or any other appropriate shape. Some examples include a secondary disc to provide a seal, in certain scenarios, and some example cages have a threaded interface to receive a stem guide to align a sealing disc to a seat ring.

Figure 1A:
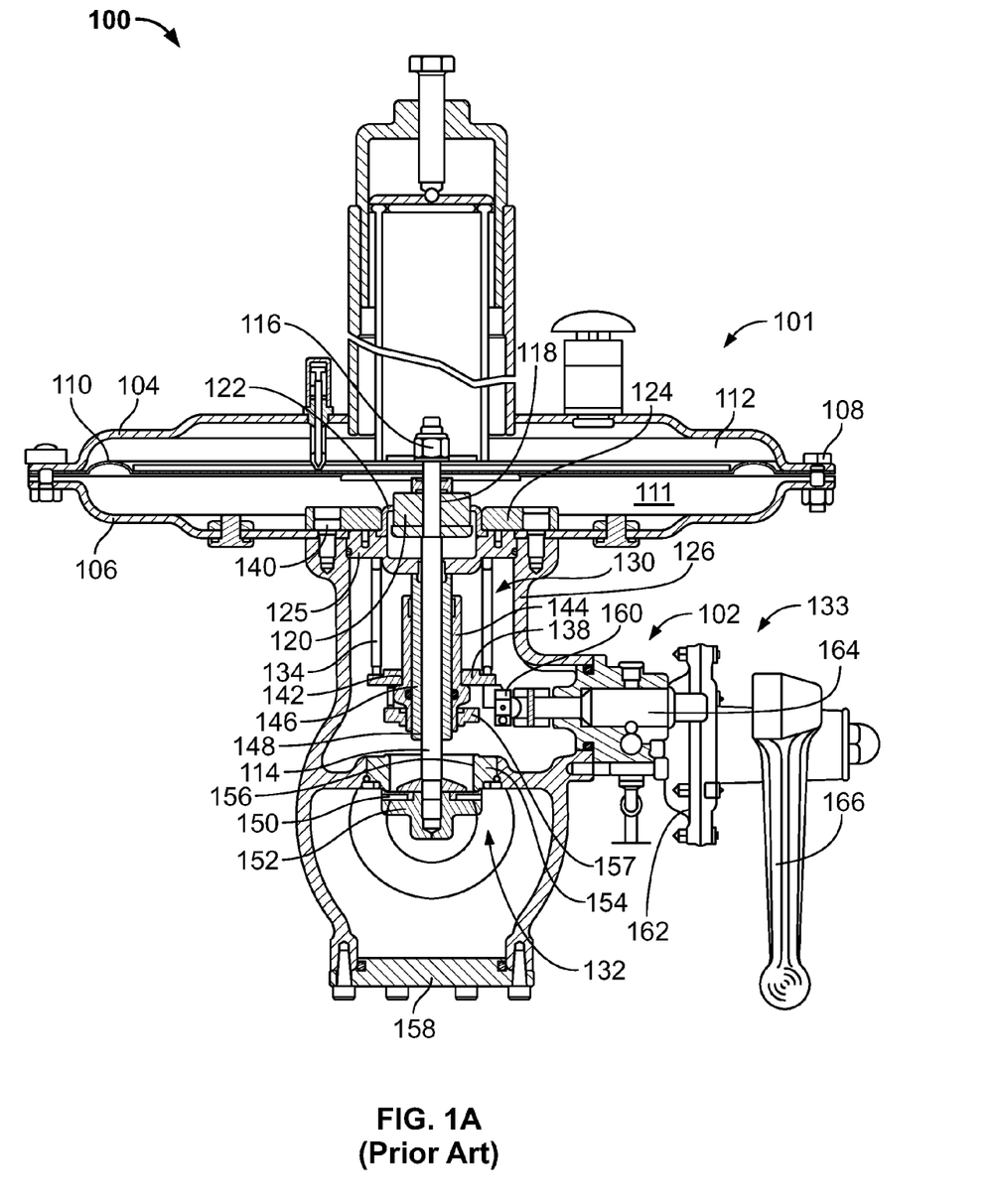
FIG. 1A is a cross-sectional view of a known fluid control valve assembly.

Before describing the example fluid control valves mentioned above, a brief description of known fluid control valve assemblies is provided below in connection with FIGS. 1A and 1B. Turning to FIG. 1A, a cross-sectional view of a known fluid control valve assembly 100 is provided. The fluid control valve assembly 100 has an actuator 101 and a valve 102. In the illustrated example, the actuator 101 has an upper casing 104 and a lower casing 106 coupled together in a conventional manner via fasteners 108. A diaphragm 110 separates the actuator 101 into an input pressure chamber 111 and a secondary chamber 112. The diaphragm 110 of the illustrated example is coupled to a valve stem 114 via a fastener 116. In this example, the valve stem 114 passes through an aperture 118 of a retainer 120 to extend into the valve 102. In this example, a peripheral portion of a balancing diaphragm 122 is captured between a stem alignment insert 125 and a retainer 124 of the valve 102. In this example, a central portion of the balancing diaphragm 122 is coupled to the retainer 120.

In this example, the valve 102 has a spring assembly 130, a seal assembly 132 and a slam-shut device 133. A spring 134 of the spring assembly 130 is disposed within the valve 102 and captured between the stem alignment insert 125 and a spring seat (e.g., shutter) 138. The stem alignment insert 125 of the illustrated example is coupled to the lower casing 106 and/or a valve body 126 via fasteners 140. The spring seat 138 of the illustrated example has a central aperture 142 to receive and align a bushing 144, which receives and aligns a sleeve 146 that has a central aperture 148 in which the valve stem 114 may move in a longitudinal direction.

The seal assembly 132 of the illustrated example includes a sealing disc 150 and a retainer 152, which couples the sealing disc 150 to the valve stem 114. In this example, the seal assembly 132 also includes a seat ring 154 (e.g., a valve seat) defining an orifice 156 through which fluid may flow through and a shutoff seal pad (e.g., a secondary sealing disc) 157. The seal assembly 132 of the illustrated example is accessible via a removable bottom cover 158 of the valve body 126.

In this example, the slam-shut device 133 has a cam 160, a controller 162, a shaft 164 and a handle 166. The shaft 164 of the illustrated example couples the cam 160 and the controller 162 together. In some examples, the cam 160, the controller 162 and/or the handle 166 rotate together. The cam 160 of the illustrated example may rest against the spring seat 138 when the shaft 164 is rotated in a default position, thereby preventing displacement of the spring seat 138.

In operation, displacement of the valve stem 114 occurs in response to an input pressure provided to the control pressure chamber 111. The input pressure displaces the diaphragm 110 in an upward direction in the orientation shown in FIG. 1A. The upward movement of the diaphragm 110 and, thus, the valve stem 114 displaces the sealing disc 150 towards the seat ring 154 to sealingly engage the seat ring 154, thereby changing (e.g., reducing or preventing) the flow of fluid through the fluid control valve assembly 100 via the orifice 156.

The fluid control valve assembly 100 of the illustrated example also has secondary sealing. In this example, rotation of the shaft 164 may occur by rotation of the handle 166 and/or pressure applied to the controller 162. This rotation causes the cam 160 to displace and/or disengage from the spring seat 138, thereby allowing the spring seat 138, which is provided a force by the spring 134, to displace downward in the orientation of FIG. 1A. The displacement of the spring seat 138, in turn, causes the shutoff seal pad 157 to sealingly engage the seat ring 154.

As mentioned above, to access and replace the sealing disc 150, the bottom cover 158 may be removed. However, in scenarios where the bottom cover 158 is inaccessible and/or generally difficult to access (e.g., an underground installation), the sealing disc 150 may have to be accessed and/or serviced via a side of the fluid control valve assembly 100 corresponding to the actuator 101 (e.g., the top). Alternatively, the entire fluid control valve assembly 100 may have to be removed from an installation site to service and/or replace the sealing disc 150, thereby resulting in a potential delay of days and/or disconnection of fluid pipes, process down time, etc.

In this example, to access the sealing disc 150 from the actuator 101 side of the fluid control valve assembly 100, the fasteners 108 are removed. In some examples, the fastener 116 must also be removed. After the upper casing 104 and the diaphragm 110 are separated (e.g., disassembled and removed), the fasteners 140 are removed to allow removal of the alignment insert 125, thereby allowing the valve stem 114 along with the sealing disc 150, the spring 134 and/or the seat ring 154 (e.g., the trim components) to be removed in an upward direction in the orientation shown in FIG. 1 for service and/or maintenance. Such removal steps may require more than two hours of labor depending on installation conditions (e.g., clearance around the fluid control valve, access area, etc.) and may also require multiple and/or specialized tools. Often, in typical valve assemblies, multiple tools are necessary to prevent unwanted rotation of a valve stem and/or a sealing disc during removal and/or installation of fasteners and/or other components. In some cases, more than one person is necessary to perform a sealing disc replacement.

The valve stem 114 of the illustrated example passes through numerous apertures of different components (e.g., the alignment insert 125, the spring seat 138, etc.). As a result, alignment of the valve stem 114 may be more difficult due to additional tolerances because of the numerous components used and the resulting tolerance stack-up of these components.

Figure 1B:
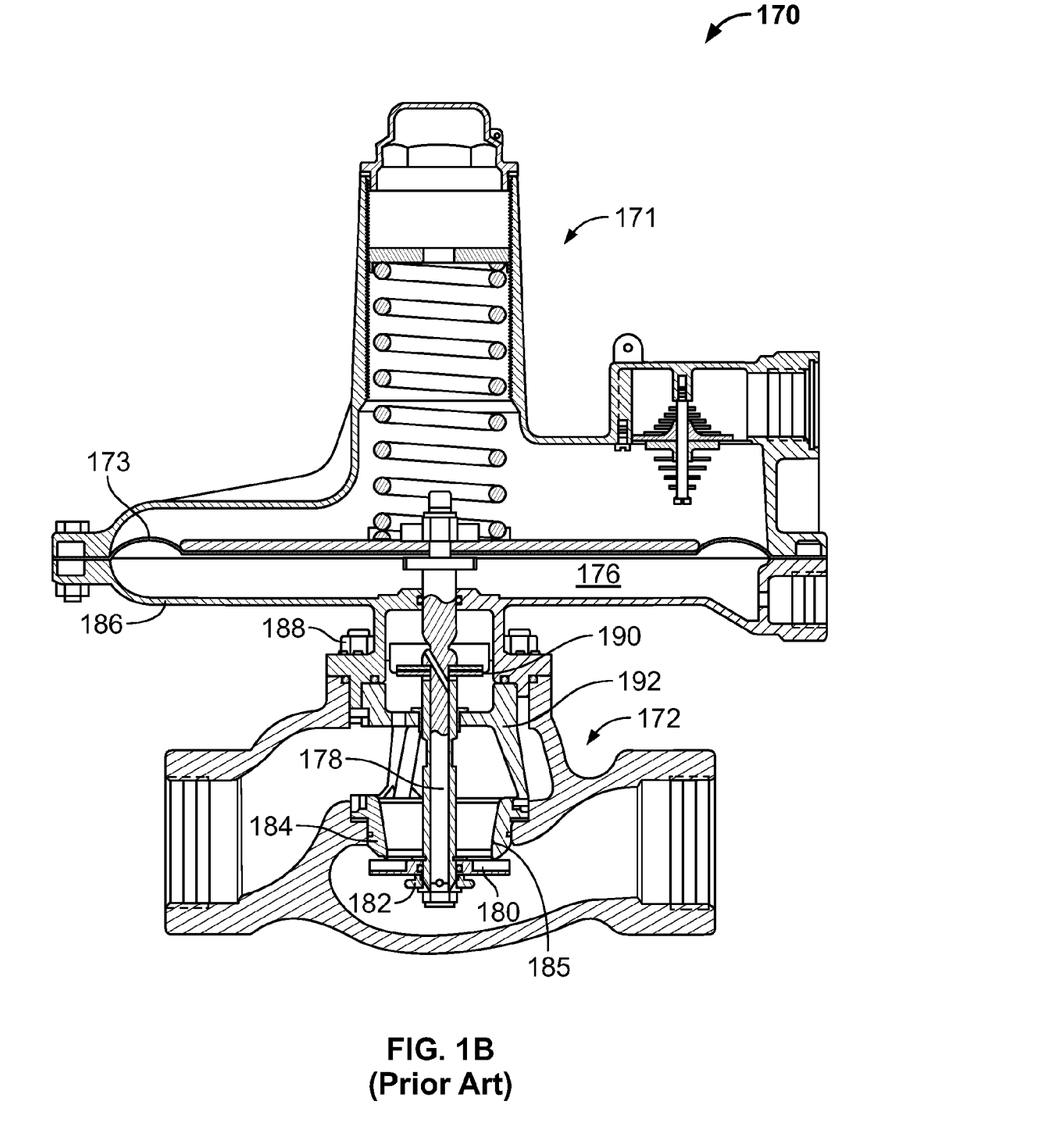
FIG. 1B is a cross-sectional view of another known fluid control valve assembly.

FIG. 1B illustrates a cross-sectional view of another known fluid control valve assembly 170 having an actuator 171 and a valve 172. Like the fluid control valve assembly 100 described in connection with FIG. 1A, a diaphragm 173 of the actuator 171 is displaced by an input pressure applied to a chamber 176, thereby displacing a valve stem 178 coupled to the diaphragm 173. Such a displacement of the valve stem 178 causes a sealing disc 180, which is coupled to the valve stem 178 via a retainer 182, to sealingly engage a seat ring (e.g., a valve seat) 184 defining an orifice 185.

In this example, a lower casing 186 of the actuator 171 is coupled to the valve 172 via fasteners 188. Removal of the fasteners 188 allows the sealing disc 180 and/or the valve stem 178 to be accessed without disassembly of the actuator 171. However, there is no access to the sealing disc 180 from the bottom as viewed in the orientation of FIG. 1B (i.e., there is no bottom cover of the valve 172 to access the sealing disc 180). A balancing diaphragm 190 of the illustrated example is captured between a cage 192 and the lower casing 186 of the actuator 171.

Figure 2:
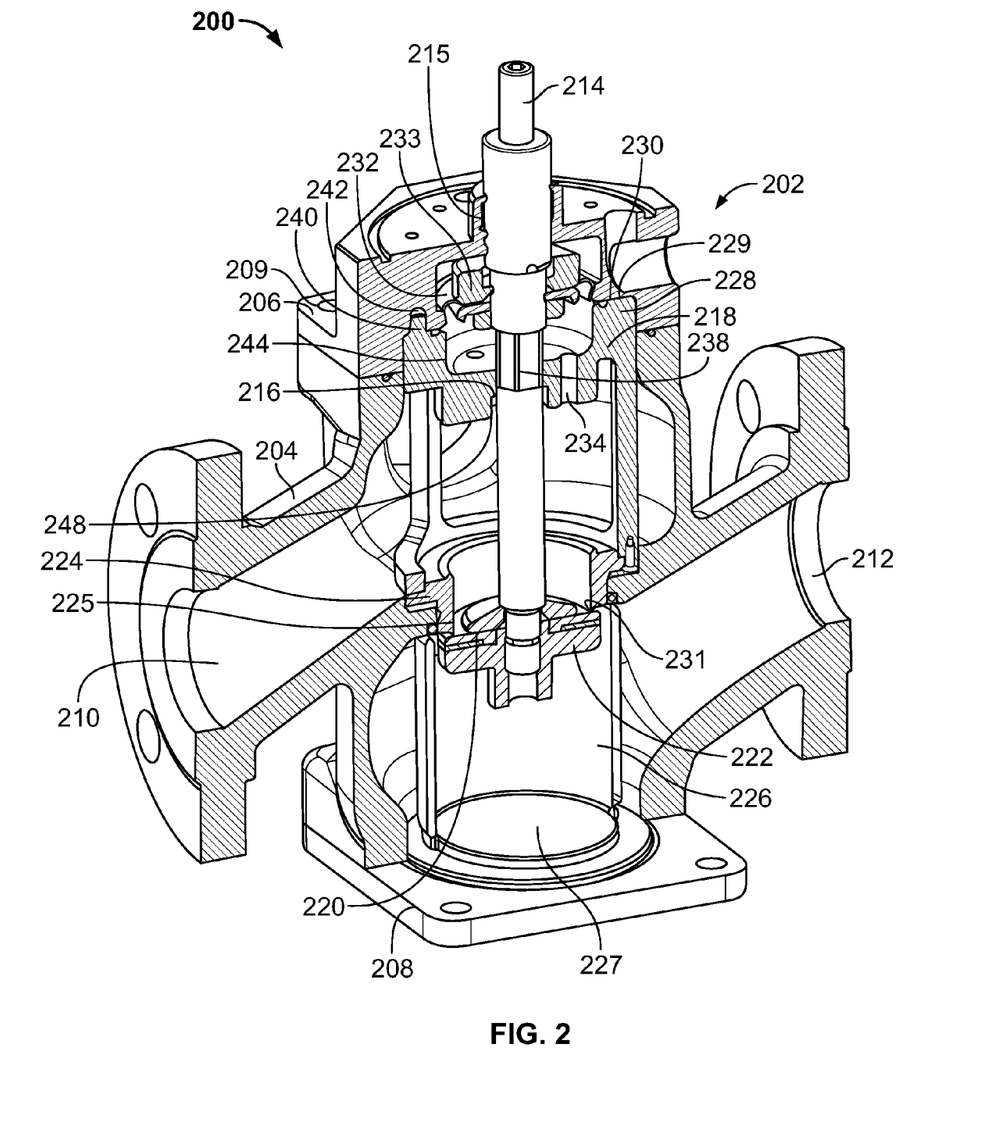
FIG. 2 is a cross-sectional view of an example fluid control valve assembly in accordance with the teachings of this disclosure.

FIG. 2 illustrates a cross-sectional view of an example fluid control valve assembly 200 in accordance with the teachings of this disclosure. The example fluid control valve 200 includes a valve 202 having a main body 204, upper removable portion (e.g., removable flange, intermediate flange, etc.) 206 and lower removable portion 208. In this example, the upper removable portion 206 is coupled to the main body 204 via fasteners (e.g., bolts) passing through apertures 209 extending through the upper removable portion 206 and threading into apertures of the main body 204. The main body 204 of the illustrated example has an opening 210 that defines an inlet and an opening 212 defining an outlet. A valve stem 214 of the illustrated example passes through a central aperture 215 of the upper removable portion 206 into the valve 202 and through a central aperture 216 of a cage 218. In this example, a sealing disc 220 and a retainer 222 are coupled to a distal portion of the valve stem 214. In the illustrated example, the retainer 222, which may be threadably coupled to the valve stem 214, retains the sealing disc 220 to the end of the valve stem 214. In some examples, multiple retainer components may be used to couple (e.g., capture) the sealing disc 220 to the valve stem 214. In this example, the sealing disc 220 sealingly engages a seat ring (e.g., a valve seat) 224 defining an orifice (e.g., aperture) 225 and positioned between the cage 218 and the main body 204. In this example, the seat ring 224 is coupled to the cage 218. In the illustrated example, a noise attenuation trim (e.g., a sound cage, silencer, etc.) 226 is captured between an aligning portion or boss (e.g., cylindrical protrusion, etc.) 227 of the removable lower portion 208 and the main body 204.

The sealing disc 220 moves toward or away from a seating surface 231 defined by the seat ring 224 to control fluid flow between the inlet 210 and the outlet 212. In this example, the cage 218 has a protrusion 228 defining a surface 229. The upper removable portion 206 of the illustrated example defines a surface 230 by which a peripheral portion of a balancing diaphragm 232 is captured between the surface 229 and the surface 230. The balancing diaphragm 232 is coupled to the valve stem 214 via a retainer 233, which may engage (e.g., contact) both sides of the diaphragm 232. In some examples, the retainer 233 may have multiple components contacting both sides of the diaphragm 232. The cage 218 of the illustrated example also has an aperture 234 to allow fluid communication between the inlet 210 and the balancing diaphragm 232. Additionally or alternatively, in some examples, the central aperture 216 of the cage 218 may have a hex-shaped cross-section (e.g., profile) to receive a hex-shaped portion 238 of the valve stem 214, thereby preventing rotation of the stem 214 relative to the cage 218 and, more generally, relative to the valve 202. In some examples, a tool (e.g., a wrench) may engage and rotate the hex-shaped portion 238 to disengage a portion of the valve stem 214 to separate the sealing disc 220 from the valve stem 214 after the valve stem 214 has been displaced relative to the cage 218 in a longitudinal direction relative to the central aperture 216. Alternatively, the central aperture 216 may have a square-shaped cross-section, a triangle-shaped cross-section, or any other appropriate shape to prevent rotation of the valve stem 214 relative to the cage 218. The cage 218 of the illustrated example also has a protrusion 240 to be received by an aperture 242 of the upper removable portion 206 to reduce movement of (e.g., constrain) the cage 218 relative to the valve 202 and/or couple the cage 218 to the upper removable portion 206. Retaining the balancing diaphragm 232 with the protrusion 228, aligning and/or preventing rotation of the valve stem 214 via a cross-sectional shape (e.g., polygonal, non-circular, etc.) of the central aperture 216 and/or aligning the protrusion 240 of the cage 218 to the upper portion 206 enables greater sealing control because of greater tolerance control of the sealing disc 220 relative to the seat ring 224 from the reduced tolerance stack ups and simplified assembly of the fluid control valve 200 due to design complexity reduction. In some examples, the cage 218 has a recess 244 defined by the protrusion 228 to allow a greater range of motion of the stem 214 relative to the cage 218.

In operation, an actuator such as, for example, the actuator 101 described above in connection with FIG. 1A, may be used to displace the valve stem 214 in response to an input force (e.g., input pressure) provided to an input pressure chamber. This displacement of the valve stem 214, in response, causes the retainer 222 and the sealing disc 220 to displace in an upward direction in the orientation of FIG. 2, thereby causing the sealing disc 220 to sealingly engage the seating surface 231 of the seat ring 224 and closing (e.g., preventing fluid flow through) the fluid control valve 200. In scenarios where a high pressure fluid is provided to the inlet 210, the aperture 234 allows fluid communication between the inlet 210 and the balancing diaphragm 232, thereby allowing the balancing diaphragm 232 to move upward in the orientation of FIG. 2 and/or providing a greater force at the seating surface 231 to enable a relatively tight seal between the sealing disc 220 and the seat ring 224. Conversely, in some examples, when low pressure fluid is provided to the inlet 210, the balancing diaphragm 232 may displace downward in the orientation of FIG. 2 to lower or eliminate the sealing force at the seating surface 231 between the sealing disc 220 and the seat ring 224 and/or displace the sealing disc 220 away from the seat ring 224.

The sealing disc 220 of the illustrated example may be replaced by first removing the top portion 206 from the main body 204, which allows access to the valve 202 via an opening defined by the removal of the top portion 206. Once the top portion 206 is removed, using a tool such as a wrench, for example, the cage 218, the valve stem 214, the balancing diaphragm 232, the retainer 233, the seat ring 224, the sealing disc 220 and/or the retainer 222 (e.g., the trim components) are removed or displaced relative to the opening, thereby facilitating access to these components and reducing the time necessary to service (e.g., replace) these components. Additionally, such a service operation may be performed by a single person using a single type of tool such as the tool used to remove the trim components.

Alternatively, the sealing disc 220 may be accessed and/or replaced by removing the bottom portion 208 instead of the top portion 206, thereby exposing the retainer 222 and/or the sealing disc 220, which may be removed via a single tool such as a hex wrench by a single person. For example, the hex wrench used may require a deep socket to engage and remove the retainer 222.

While the trim components of the fluid control valve assembly 100 described above in connection with FIG. 1A are accessible from the top and bottom of the assembly 100, replacement via the top requires numerous disassembly steps including extensive disassembly of the actuator 101 due to the numerous components surrounding the spring 134 and/or removal of the fasteners 140 prior to accessing the sealing disc 150 for service and/or maintenance. These numerous disassembly steps may require many different types of tools or specialized tools.

In this example, replacement of the sealing disc 220 does not require adjustment of force set points (e.g., adjustment of force provided to a diaphragm, which may be provided by a spring or an adjustment screw, coupled to the valve stem 214) because the components of an actuator coupled to the fluid control valve assembly 200 do not need to be disassembled. In other words, avoiding actuator disassembly to access the sealing disc 220 minimizes the need to reset force set points. In some examples, the noise attenuation trim 226 is also removed with the bottom portion 208. In some examples, the noise attenuation trim 226 is integral with the bottom portion 208.

Additionally, as described above, the cage 202 may align to the valve 202 via the protrusion 240 and align the hexed-shaped portion 238 of the valve stem 214 to more effectively control the alignment of the sealing disc 220 to the seat ring 224, thereby allowing the sealing disc 220 to more effectively engage the sealing surface 231. Additionally or alternatively, the cage 218 may have a threaded portion 248 in the central aperture 216 to threadably engage a stem guide such as a bushing 320 or a sleeve 318 described below in connection with FIG. 3 for improved alignment. Such integration of alignment features of the described example allows improved control of part variation (e.g., tolerances). Also, reduced manufacturing costs may be realized with the integral features of the cage 218, for example, due to the resulting reduction of components, assemblies and/or SKUs to be managed via inventory tracking and/or sourcing. Further, reduction of tolerance variation and/or variation across numerous parts allows greater tolerance control of the seal, thereby allowing more precise and improved effectiveness of sealing discs. Part integration also allows improved access to the sealing discs due to the reduction in parts to be disassembled to access sealing discs (e.g., a reduced number of disassembly steps, components and/or fasteners needed). In particular, removing the top portion 206 enables direct access to the cage 218 and/or the balancing diaphragm 232.

Figure 3:
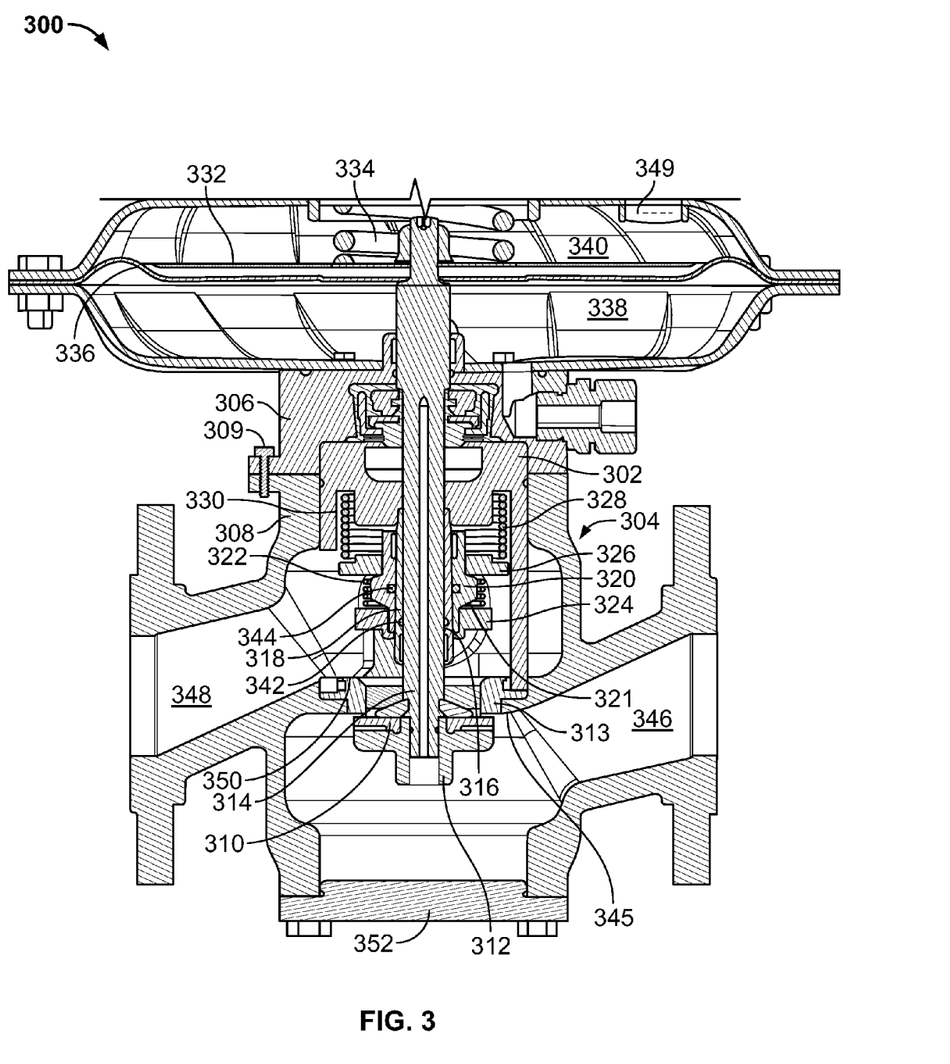
FIG. 3 is a cross-sectional view of another example fluid control valve assembly with a protective device.

FIG. 3 is a cross-sectional view of another example fluid control valve assembly 300 with a protective device. With reference to FIG. 3, a cage 302 of a valve body 304 is positioned (e.g., captured) between an upper portion 306 and a main portion 308 of the valve body 304. In this example, the upper portion 306 and the main portion 308 are coupled together with fasteners (e.g., bolts) 309 in a conventional manner along the exteriors of the upper portion 306 and the main portion 308. Like the fluid control valve 200 described above in connection with FIG. 2, a sealing disc 310 of the illustrated example is captured (e.g., positioned) by a retainer 312 to couple the sealing disc 310, which sealingly engages a seat ring 313, to a valve stem 314. In this example, the valve stem 314 moves along an axis defined by an aperture 316. In this example, the valve stem 314 is positioned within the sleeve 318, which is positioned within the bushing 320, which may have beveled outer surfaces 321. A lower spring 322 of the illustrated example is captured between a shutoff seal pad (e.g., a second sealing disc) 324, which is coupled to and/or engages (e.g., contacts) the sleeve 318 and/or the bushing 320, and a seat 326. In some examples, the beveled outer surfaces 321 may define an area of separation between the shutoff seal pad 324 and the seat 326. In this example, an upper spring 328 is captured and/or positioned between the seat 326 and a recess 330 of the cage 302. The valve stem 314 of the illustrated example is also coupled to a seat 332 that contacts an upper spring 334. Similar to the valve 200, the valve stem 314 is coupled to a diaphragm 336 that separates a primary input chamber 338 from a secondary input chamber 340.

In this example, the valve stem 314 seals to the sleeve 318 via a seal (e.g., an O-ring or gasket seal, etc.) 342. Likewise, the sleeve 318 of the illustrated example seals to the bushing 320 via a seal (e.g., an O-ring or gasket seal, etc.) 344.

Similar to the operation of the fluid control valve 200, the fluid control valve 300 is operated by an input pressure being applied into the primary input chamber 338, thereby causing the diaphragm 336 to displace upwards in the orientation of FIG. 3 and, thus, moving the sealing disc 310 to engage (e.g., sealingly engage) a first sealing surface 345 defined by the seat ring 313. In some examples, a differential force may be applied to the diaphragm 336 when a pressure is applied into the secondary input chamber 340 via an opening 349, thereby allowing differential control of the sealing engagement of the sealing disc 310. In some examples, the pressure provided to the secondary input chamber may be provided by allowing fluid communication between pressurized fluid from the outlet 346 into the opening 349 and, thus, the secondary input chamber 340. In other examples, the pressurized input delivered into the secondary input chamber 340 may be provided by other external sources.

In contrast to the example fluid control valve 200, the fluid control valve 300 has a protective mechanism such as a slam-shut device to allow an outlet 346 and an inlet 348 to be isolated in some situations. Such a protective mechanism may be operated when shutoff seal pad 324 engages a sealing surface 350. Like the slam-shut device 133 described above in connection with FIG. 1A, movement of a cam to disengage the cam from the seat 326 allows the force of the upper spring 328 to displace the lower spring 322 downward in the orientation of FIG. 3, thereby causing the shutoff seal pad 324 to displace toward the seat ring 313 or, more generally, towards the main portion 308 of the valve body 304 to sealingly engage a second sealing surface 350 defined by the seat ring 313 and/or the valve body 304.

Similar to the fluid control valve 200, the sealing disc 310 of the illustrated example may be easily accessed and/or replaced by removal of a bottom panel 352. Likewise, the sealing disc 310 may also be easily accessed by separating (e.g., decoupling) the top portion 306 from the main portion 308. Further, the cage 302 may have the alignment features and/or part integration, etc. described above in connection with FIG. 2 to improve the alignment of the sealing disc 310 to the seat ring 313 and/or reduce tolerance stack-up.

Figure 4:
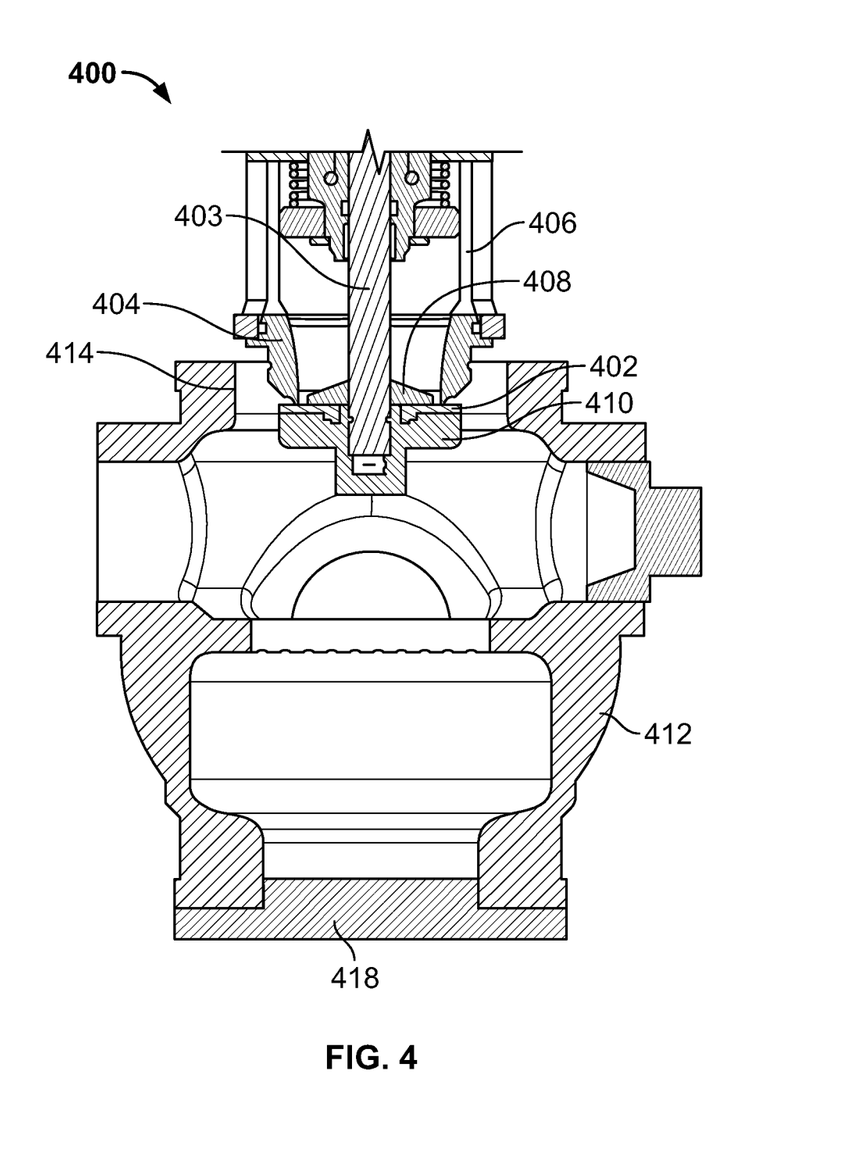
FIG. 4 is a cross-sectional view of an example fluid control valve.

FIG. 4 is a cross-sectional view of a valve assembly 400 in which trim components, which may include a sealing disc 402, a valve stem 403, a seat ring 404, a cage 406, retainers 408 and 410, and/or protective components (e.g., slam-shut device), etc., are being accessed and/or replaced from the top of the valve assembly 400 as viewed in the orientation of FIG. 4 after a top portion has been removed from a valve body 412. In this example, the trim components are coupled to an actuator when they are separated from the valve body 408 for replacement and/or servicing. Such a removal is enabled because an aperture 414 has a sufficient diameter or size to allow the trim components to be removed from the valve body 412. In this example, a removable bottom portion 418 does not need to be removed to access the sealing disc 402 and/or other trim components, which may be advantageous in situations such as underground installations, for example, where it is difficult to access the bottom portion 418 for removal without moving and/or removing the valve assembly 400 entirely. The teachings of the valve assembly 400 may be applied to the control valve 200 and the fluid control valve assembly 300 of FIGS. 2 and 3, respectively, and vice-versa.

Figure 5:
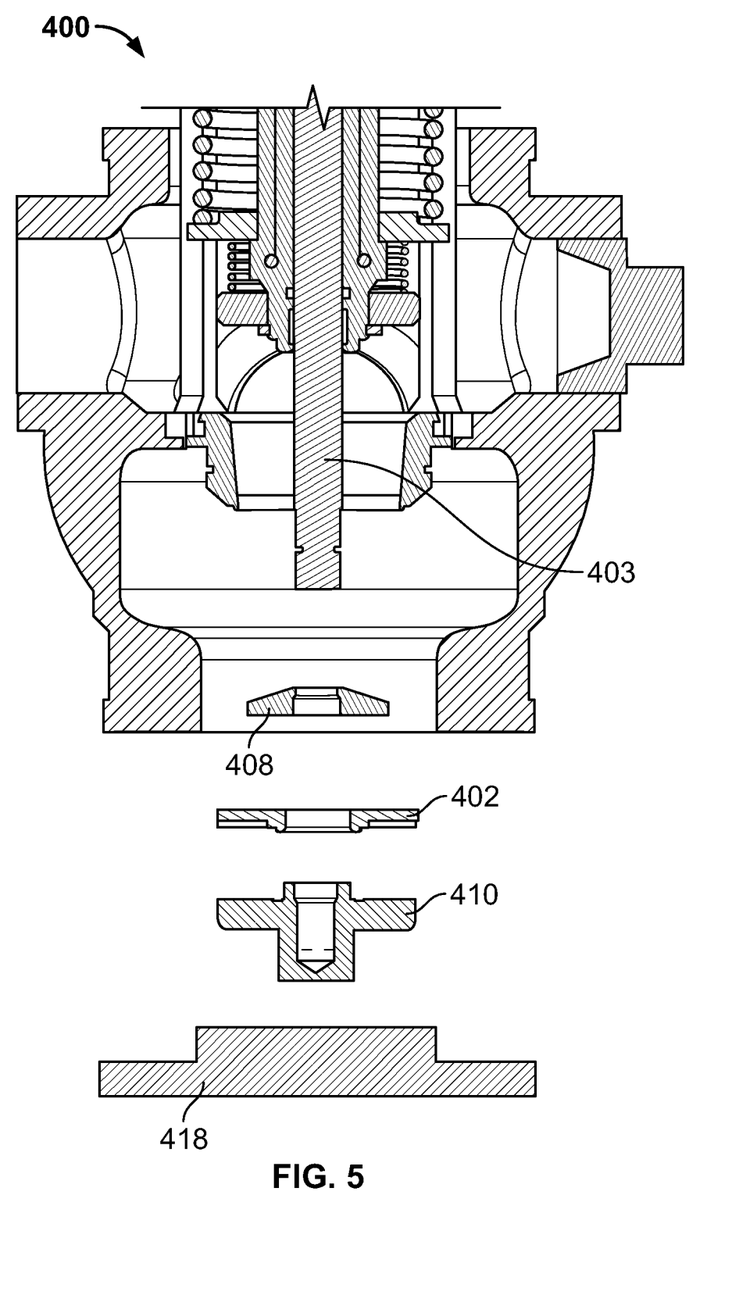
FIG. 5 is an exploded cross-sectional view of the example fluid control valve of FIG. 4.

FIG. 5 is an exploded cross-sectional view of the valve 400 described above in connection with FIG. 4. In this example, the bottom portion 418 has been removed to access the sealing disc 402. The sealing disc 402 of the illustrated example is removed from the valve stem 403 by removal of the retainers 408 and 410. In this example, the sealing disc 402 may be accessed and/or replaced without disengaging the other trim components from an actuator. In some examples, applying a tool (e.g., a hex wrench) to the retainers the retainer 408, the retainer 410 and/or the valve stem 403 allows a relatively quick removal of the sealing disc 402. The teachings of the valve assembly 400 described in connection with FIGS. 4 and 5 may be applied to the control valve 200 and the fluid control valve assembly 300 of FIGS. 2 and 3, respectively, and vice-versa.

Although certain example apparatus and methods have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
a cage of a fluid regulator, the cage having a central aperture;
a valve stem to be received by the central aperture; and
a diaphragm coupled to the valve stem, wherein an integral protrusion of the cage is to constrain a peripheral edge of the diaphragm against a removable portion of a valve body when the removable portion is coupled to the valve body, wherein the removable portion of the valve body at least partially defines an outer surface of the valve body, the cage further comprising a threaded portion to receive a valve stem guide to align the valve stem.

2. The apparatus as defined in claim 1, further comprising a second integral protrusion to be received by a recess of the valve body to constrain the cage relative to the valve body.

3. The apparatus as defined in claim 1, wherein the central aperture has a first shape and the stem has a second shape complementary to the first shape to prevent rotation of the stem.

4. The apparatus as defined in claim 3, wherein the first and second shapes comprise hex shapes, square shapes, pentagonal shapes, oval, or triangular shapes.

5. The apparatus as defined in claim 1, wherein the removable portion comprises a first removable portion, and wherein the valve body further comprises a second removable portion to access a sealing disc, the first and second removable portions on opposite sides of the valve body.

6. The apparatus as defined in claim 1, further comprising first and second discs coupled to the valve stem, the second disc to engage a spring to affect the motion of the first disc relative to an orifice.

7. The apparatus as defined in claim 1, wherein the central aperture aligns the valve stem.

8. The apparatus as defined in claim 1, wherein the valve stem has a removable stem portion threadably coupled to the valve stem.

9. The apparatus as defined in claim 1, wherein the removable portion is coupled to the main portion via an externally accessible fastener.

10. The apparatus as defined in claim 9, wherein the removable portion contacts at least a portion of the cage when the removable portion is coupled to the main portion.

11. The apparatus as defined in claim 1, wherein the removable portion includes a central aperture to align the valve stem.

12. An apparatus comprising:
a valve body of a fluid regulator;
a cage disposed in the valve body, the cage to engage a diaphragm;
a valve stem to move along a central aperture of the cage; and
a removable portion of the valve body at a first end of the valve body where the stem enters the valve body, the removable portion to capture a portion of the diaphragm against the cage when the removable portion is assembled to a main body of the valve body, wherein the removable portion of the valve body at least partially defines an outer surface of the valve body, the removal of the removable portion to allow access to a first sealing disc from the first end, wherein a second sealing disc is coupled to the valve stem, the second sealing disc to engage a seat ring when a shaft of a slam-shut device is rotated.

13. The apparatus as defined in claim 12, further comprising a second removable portion at a second end of the valve body to allow access to the first sealing disc from the second end, the second end opposite the first end.

14. The apparatus as defined in claim 12, wherein removing the removable portion allows removal of the cage from the valve body.

15. The apparatus as defined in claim 12, wherein a peripheral edge of the diaphragm is captured between the removable portion and the cage.

16. The apparatus as defined in claim 12, wherein the cage further comprises a protrusion on an external surface of the cage to be received by an aperture of the valve body.

17. A method comprising:
rotating a shaft of a slam-shut device to disengage a first sealing disc from a seat ring;
removing a removable portion of a valve body from a main portion of the valve body, the removable portion on a first end of the valve body where a stem is to enter the valve body, the removable portion defining an external surface of the valve body;
removing a cage from the valve body through a first aperture provided by the removal of the removable portion, wherein a second aperture of the cage aligns the stem;
removing a diaphragm, the diaphragm captured between the cage and the removable portion when the removable portion is coupled to the main portion; and
accessing a second sealing disc of the valve body via the first aperture.

18. The method as defined in claim 17, wherein removing the removable portion and removing the cage occurs simultaneously.

19. The method as defined in claim 17, further comprising removing a portion of the stem to access the second sealing disc.

20. The method as defined in claim 17, further comprising removing the second sealing disc from the valve body via the first aperture.

21. The method as defined in claim 17, wherein the valve body further comprises a second removable portion on a second end of the valve body opposite the first end.

* * * * *